(12) United States Patent
Farrell

(10) Patent No.: US 12,717,224 B2
(45) Date of Patent: Aug. 25, 2026

(54) CAMERA FOR A MOTOR VEHICLE WITH SPECIFIC LENS HEATER, AS WELL AS MOTOR VEHICLE

(71) Applicant: Connaught Electronics Ltd., Tuam (IE)

(72) Inventor: Noel Farrell, Tuam (IE)

(73) Assignee: Connaught Electronics Ltd., Tuam (IE)

( * ) Notice: Subject to any disclaimer, the term of this patent is extended or adjusted under 35 U.S.C. 154(b) by 203 days.

(21) Appl. No.: 18/564,492

(22) PCT Filed: May 19, 2022

(86) PCT No.: PCT/EP2022/063557
§ 371 (c)(1),
(2) Date: Nov. 27, 2023

(87) PCT Pub. No.: WO2022/248327
PCT Pub. Date: Dec. 1, 2022

(65) Prior Publication Data

US 2024/0255841 A1 Aug. 1, 2024

(30) Foreign Application Priority Data

May 27, 2021 (DE) ..................... 10 2021 113 714.4

(51) Int. Cl.
*G03B 30/00* (2021.01)
*G02B 27/00* (2006.01)
*G03B 17/55* (2021.01)

(52) U.S. Cl.
CPC ......... *G03B 30/00* (2021.01); *G02B 27/0006* (2013.01); *G03B 17/55* (2013.01)

(58) Field of Classification Search
CPC ................................ G03B 30/00; G03B 17/55
See application file for complete search history.

(56) References Cited

U.S. PATENT DOCUMENTS 5,350,713 A * 9/1994 Liang .................... H01L 23/315 257/E23.128
2003/0203532 A1* 10/2003 Misawa ................ H10F 39/806 438/89

(Continued)

FOREIGN PATENT DOCUMENTS

CN 104717410 A 6/2015
CN 107197130 A 9/2017

(Continued)

OTHER PUBLICATIONS

International Search Report and Written Opinion in corresponding International Application No. PCT/EP2022/063557, dated Aug. 23, 2022 (9 pages).

(Continued)

*Primary Examiner* — Noam Reisner
(74) *Attorney, Agent, or Firm* — Osha Bergman Watanabe & Burton LLP

(57) ABSTRACT

A camera for a motor vehicle includes a housing. The housing bounds a receiving space that contains a lens module and a circuit board. The camera includes a longitudinal axis and a heater for heating the lens module. The circuit board and the lens module are arranged axially spaced from each other in the direction of the longitudinal axis of the camera so that a clearance is formed between the circuit board and the lens module. A support plate of the camera is arranged between the circuit board and the lens module. The support plate is a component separate from the circuit board, the housing, and the lens module. The support plate includes first electrical contact areas that are able to connect to electrical lines of the heater. Electrical energy is able to flow to the lens module to heat the lens module.

13 Claims, 6 Drawing Sheets

(56) References Cited

U.S. PATENT DOCUMENTS

Figure 1:
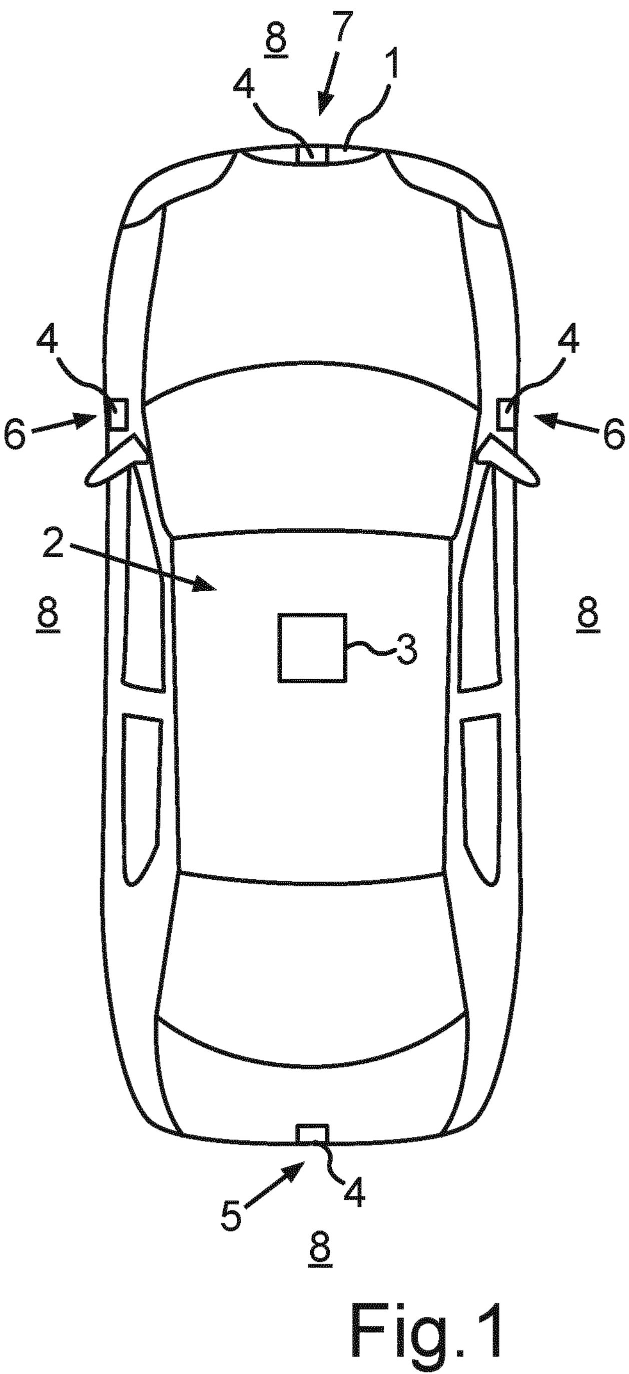

| | | | | |
|---|---|---|---|---|
| 2018/0176431 | A1* | 6/2018 | Kim | G02B 27/0006 |
| 2018/0345911 | A1 | 12/2018 | Zurowski et al. | |
| 2019/0353987 | A1 | 11/2019 | Choi et al. | |
| 2020/0204712 | A1 | 6/2020 | Kim et al. | |
| 2020/0218034 | A1 | 7/2020 | Wang et al. | |
| 2020/0314311 | A1 | 10/2020 | Liu et al. | |

FOREIGN PATENT DOCUMENTS

| | | | |
|---|---|---|---|
| CN | 107690594 | A | 2/2018 |
| CN | 110618514 | A | 12/2019 |
| CN | 111433670 | A | 7/2020 |
| CN | 111919169 | A | 11/2020 |
| DE | 102015116926 | A1 | 4/2016 |
| DE | 102015111281 | A1 | 1/2017 |
| DE | 102017201460 | A1 | 3/2018 |
| DE | 102020212418 | A1 | 4/2021 |
| JP | 2009-512346 | A | 3/2009 |
| JP | 2012160469 | A | 8/2012 |
| JP | 2016065982 | A | 4/2016 |
| KR | 200379050 | Y1 | 3/2005 |
| WO | 2013/118501 | A1 | 8/2013 |
| WO | 2018/225503 | A1 | 12/2018 |

OTHER PUBLICATIONS

German Search Report in corresponding German Application No. 10 2021 113 714.4, dated Apr. 12, 2022 (5 pages).

Office Action issued in corresponding Japanese Patent Application No. 2023-572893 mailed Dec. 3, 2024 (9 pages).

Office Action issued by the Korean Patent Office for corresponding Korean Patent Appln. No. 2023-7040515, mailed Oct. 13, 2025 (11 pages).

Office Action issued by the CNIPA for corresponding Chinese Patent Application No. 202280037704.9, mailed Apr. 25, 2026 (20 pages).

* cited by examiner 37
36
38
35
28a
14
16
29
30
27
9
28
10
25
41
12a
12b
4

CAMERA FOR A MOTOR VEHICLE WITH SPECIFIC LENS HEATER, AS WELL AS MOTOR VEHICLE

An aspect of the invention relates to a camera for a motor vehicle. The camera comprises an exterior housing or a housing. A receiving space of the camera is bounded by this housing. A lens module of the camera and a circuit board of the camera are arranged in the receiving space. Moreover, the camera comprises a heater for heating the lens module.

Cameras arranged in a motor vehicle are known in diverse configuration. In this context, it is known that cameras are formed and arranged for environmental capture of the motor vehicle. However, cameras can moreover also be employed for the capture of an interior space of the vehicle and are correspondingly arranged there. In this context, cameras are exposed to very different influences, which they have to withstand. This in particular relates to severe temperature fluctuations and/or severely fluctuating environmental influences. Moreover, cameras are also exposed to mechanical stresses due to the vibrations in moving the vehicle, which they have to permanently withstand. In this context, it is then in particular also a requirement to still be able to be highly functionally operated under these conditions and to allow sufficiently good image captures, which can then be provided to driver assistance systems, and it is evaluated if and optionally how a driver assistance system acts, based on this image information, respectively.

In such extremely compactly constructed cameras for a motor vehicle, it is known that an exterior housing is formed of separate housing parts, a housing top part and a housing bottom part. These housing parts are assembled and form a receiving space for further components, in particular a lens module and at least one circuit board, in the interior.

Heaters for such cameras, in particular for heating the lens modules, are also known. Thereto, it may for example be made reference to DE 10 2015 111 281 A1 and DE 10 2015 116 926 A1. Similarly, a camera for a motor vehicle with a heater for a lens is for example known from US 2020/0314311 A1. Further, it is provided that the heater itself comprises a ring, which directly abuts on a rear side of a lens to be able to heat it. Strips protrude from this ring, which is arranged in the lens module, which are laid on a housing inner side in axial or stepped manner and connected to electrical contacts on a circuit board. The ring is formed integrally with the strips.

In compact cameras in the motor vehicle technology, a sharp image capture is particularly important. Thereby, it is also important that the optical path in the camera, which forms between an image sensor of the camera and at least one lens of the camera, can be kept very clean.

In these heaters, the contacting is disadvantageous. Thereby, heating the lens module can only be possible in restricted manner on the one hand, on the other hand, interfaces, at which electrical contacts are connected to each other, can be impaired. Thereby, the electrical energy transfer from an energy source to the heater is also optionally impaired.

It is the object of the present invention to provide a camera and a motor vehicle with such a camera, in which improved heating of a lens module of the camera is allowed.

This object is solved by a camera and a motor vehicle according to the independent claims.

An aspect of the invention relates to a camera for a motor vehicle. The camera comprises an exterior housing or a housing. A receiving space is bounded by this housing. A lens module of the camera and a circuit board of the camera are arranged in the receiving space. Moreover, the camera comprises a heater for heating the lens module. The circuit board and the lens module are arranged axially spaced from each other in the direction of a longitudinal axis of the camera. Thereto, an axial clearance is thus formed between the circuit board and the lens module. A support plate is arranged between the circuit board and the lens module. The support plate of the camera is a component separate from the circuit board, from the housing and from the lens module. The support plate comprises first electrical contact areas, to which electrical lines of the heater can be connected. These lines are led from the lens module to the first contact areas. Additionally or instead, the support plate comprises second electrical contact areas different from the first contact areas. Electrical contact elements, which are arranged on the circuit board, can be connected to these second electrical contact areas. In particular, they are connected thereto. Thereby, energy can be transferred from the circuit board, in particular an energy source on the circuit board, to the lens module to perform the heating of the lens module with the heater.

In an embodiment, the lens module is connected to the housing by a screw connection. In an embodiment, the housing comprises a front housing part. It is to be regarded in the direction of the longitudinal axis of the camera. The lens module is directly attached to the front housing part. It is directly attached in the front housing part by the screw connection. Thereto, the lens module comprises a thread, which is screwed into a mating thread on the front housing part. In particular, the front housing part comprises a hole, the bounding walls of which comprise this mating thread.

Especially in such embodiments with a screw connection between the lens module and the housing on the one hand and the lines of the heater on the other hand, which are fixedly arranged in the lens module, the position of these lines is not exactly known in the screwed-in state of the lens module in the housing part. Therefore, corresponding position problems and connection problems occur if such an arrangement is provided. Because these lines of the heater, which are led from the lens module, can then only very difficultly be directly attached, in particular welded, to a circuit board. By the invention, it is advantageous especially in such constellations, because by this additional support plate, these lines from the lens module can first be directly attached, in particular soldered, to the electrical first contact areas. Thereto, the corresponding soldering of these lines to the first contact areas can be effected when the lens module is screwed in the housing part.

However, it is also possible that the lens module is first connected to the support plate. Thereto, the lines from the lens module can be soldered to the first electrical contact areas. This overall module can then be attached to, in particular screwed into, the housing part. The electrical interfaces between the lines of the heater of the lens module and other components are then noncritical. Because the relevant support plate is arranged separately from the circuit board and can be more flexibly positioned in this respect.

By this support plate, thus, the lines of the heater, which lead from the lens module, are no longer directly connected to the circuit board. In this respect, an indirect coupling is formed via the support plate.

The support plate is arranged outside of the lens module.

In an embodiment, the support plate is annularly formed. It is in particular a ring plate. The support plate is arranged in the clearance such that light in the optical path of the camera, which extends between the lens module and an image sensor of the camera, which is arranged on the circuit board, passes through a hole in the ring plate. Thereby, this optical path is not covered or otherwise impeded by the support plate.

In an embodiment the camera comprises a seal. This seal is arranged in an axial clearance between the circuit board and the front housing part and/or the lens module. The clearance is sealed from the remaining volume of the receiving space in the housing by the elastic seal.

A further independent aspect of the invention relates to a camera for a motor vehicle. The camera comprises an exterior housing or a housing. A receiving space of the camera is bounded by the housing. A lens module of the camera is arranged in the receiving space at least in certain areas. Moreover, a circuit board of the camera is arranged in the receiving space. The circuit board and the lens module are arranged axially spaced from each other viewed in the direction of a longitudinal axis of the camera. In particular, the longitudinal axis is also the longitudinal axis of the lens module. A clearance or an air space is formed between the circuit board and the lens module by this axially spaced arrangement. An elastic seal of the camera is arranged between the circuit board and the lens module. The clearance is sealed from the remaining volume of the receiving space in the housing by the elastic seal. Therefore, it is provided by the invention that a specific partial volume of the receiving space, which is formed between the rear end of the lens module and the circuit board in axial direction, is specifically protected. By the elastic seal, which is in particular a component of the camera separate from the circuit board and from the lens module, thus, a partition is virtually also formed. Especially this clearance, in which the light is guided from the lens module to an image sensor on the circuit board, is thus bounded by this elastic seal. Thereby, this clearance is thus virtually generated as a partial volume space of the receiving space bounded by the seal. By this configuration, it can be avoided in improved manner that dust or dirt can get into this clearance. Thereby, the optical path between the lens module and the image sensor on the circuit board can be particularly advantageously protected from dust and dirt in improved manner. By the elastic seal, it is moreover allowed that not only a relevant volume delimitation is formed by a partition of any kind. Rather, a certain deformation is also allowed by this elastic configuration and the realization of this separating wall as a seal. Thereby, undesired gaps between the seal and the circuit board on the one hand and the seal and the lens module on the other hand can be avoided even with position variations between the circuit board and the lens module.

In an embodiment, the seal is formed at least as a ring section. This means that the seal is formed circumferentially at least in certain areas in circumferential direction of the longitudinal axis. Preferably, this seal is formed as a circumferentially closed ring. Thereby, this clearance can be circumferentially completely bounded by the seal in particularly advantageous manner. Thus, the optical path is virtually completely housed by this seal.

In an embodiment, the seal is directly abutting on a top side of the circuit board with a first rim. This first rim is that rim viewed in axial direction, which faces the circuit board. Thereby, direct mechanical abutment of this seal on the top side of the circuit board is also realized. Thereby, a stable fit of the seal is also allowed.

In an embodiment, a receptacle for the seal is formed on this top side of the circuit board. This receptacle is a groove-shaped recess in an embodiment. The seal extends into this groove-shaped recess with the first rim. Thereby, a particularly accurate positioning of the seal in relation to the circuit board can be achieved on the one hand. An undesired radial displacement of the seal is thereby prevented. In particular if the seal is changed in its shape in axial direction, for example is compressed or else expands, the radial position can nevertheless be relatively accurately maintained on the circuit board. Especially this first rim of the seal remains arranged in particularly exact radial position in this embodiment.

In an embodiment, the housing of the camera comprises a front housing part viewed in axial direction. The lens module is arranged in this front housing part. This means that the lens module extends into this front housing part at least in certain areas. In particular, the lens module is introduced into this front housing part into an opening in the front housing part. In the assembled state, the lens module partially extends within the front housing part and partially outside. The front housing part preferably comprises an abutment surface facing the circuit board. The elastic seal abuts on this abutment surface with a second rim. The second rim is opposing the first rim of this seal viewed in the direction of the longitudinal axis. Thus, a direct mechanical contact between the seal and the housing part can also be achieved in this embodiment. Thereby too, the stable and positionally secure arrangement of the seal is supported. Then, the seal is virtually positioned directly between the circuit board and the housing part.

It can be provided that this abutment surface of the front housing part comprises a receptacle for this second rim of the seal. This second receptacle can be a groove-shaped recess in an embodiment. Thereby too, this seal can then be arranged in this abutment surface with the second rim recessed at least in certain areas.

In an embodiment, the seal is arranged axially compressed between the circuit board and the abutment surface in the assembled final state. Thereby, the positionally secure mechanical arrangement is improved on the one hand, the dust-proof housing of the clearance is improved on the other hand.

In an embodiment, in the clearance, an optical path of the camera extending between an image sensor of the camera and a bottom side of the lens module facing the image sensor is separated from the remaining volume space of the housing in dust-proof manner at least in certain areas by the seal. The image sensor is arranged on the top side of the circuit board. Thereby, this light path between the lens module and the image sensor is particularly protected from dust and dirt in particular advantageousness.

In an embodiment, the lens module comprises a receiving sleeve. At least one lens of this lens module is arranged in this receiving sleeve. The carrier sleeve of the lens module is in particular a component separate from the housing, in particular from the front housing part.

In an embodiment, the elastic seal is, especially non-detachably, arranged on a support plate of the camera. The support plate is in particular an annular support plate. In particular, it is stiffer than the seal. By this separate support plate, a component is provided, which allows that the seal is first directly attached thereto. Thereby, in an embodiment, an undesired deformation of the seal in radial direction to the longitudinal axis is avoided. In that the support plate is annularly formed, it comprises a hole. This is advantageous to the effect that the light path between the circuit board and the bottom side of the lens module, which faces this circuit board, is thus not covered. Thus, this annular support plate is in particular positioned such that the optical path between the image sensor of the camera and the bottom side of the lens module is not covered. This support plate is in particular integrally formed. It is a component separate from the lens module, from the circuit board and from the housing. In particular, this annular support plate is received in the receiving space of the housing. In particular, it is completely received therein. In axial direction, this annular support plate is arranged between the circuit board and the lens module. In an embodiment, the elasticity of the seal is greater, in particular much greater than the elasticity of the support plate. In an embodiment, the support plate is dimensionally stable, in particular compared to the seal.

In an embodiment the support plate is arranged at the lens module, especially at the rear side of the lens module. The clearance between the circuit board and the support plate is sealed, especially to the remaining volume area of the receiving space. In an embodiment the support plate, especially a front side of the support plate, is arranged directly at the front housing part.

In an embodiment, the support plate can be a functional component. In this context, it can also be used as a support member for further components.

In an embodiment, the seal is arranged at an outer edge of the support plate. In this context, the outer edge connects a flat top side and a flat bottom side of the support plate. Thus, the outer edge represents a narrow rim of the support plate. By such a configuration, the seal is virtually arranged directly on the support plate circumferentially around it on the rim side at least in certain areas. Thereby, the relevant stabilizing effect is supported in particular in radial direction for the seal. Furthermore, viewed in axial direction, the upper rim and the lower rim of this seal are exposed and not restricted by the support plate by such a configuration. Viewed in the direction of the longitudinal axis of the camera, the seal in particular extends on a side of the support plate farther than the support plate itself.

In an embodiment, the seal extends beyond the dimensions of the support plate on both sides viewed in the direction of the longitudinal axis. Thus, the seal is higher or thicker than the support plate viewed in this axial direction. Thereby, in an embodiment, an advantageous direct mechanical contact with the circuit board and/or a front housing part of the camera can be achieved by this axial cantilevered arrangement of the seal compared to the support plate.

In an embodiment the seal is not arranged at an outer edge of the support plate but is arranged on a top side of the support plate. In this embodiment the seal does not extend on both sides of the support plate but extends only from the top side to the circuit board.

In an embodiment, the support plate is a component separate from the circuit board, from the housing of the camera and from the lens module. The support plate is arranged in this clearance between the circuit board and the lens module. The support plate is arranged outside of the lens module in the receiving space.

It can be provided that the support plate is arranged in contactless manner with the circuit board and/or in contactless manner with the lens module. In this context, it can then also be arranged supported floating in this clearance. In this respect, only a mechanical contact from the seal directly with the circuit board on the one hand and/or from the seal with the front housing part on the other hand can then be provided.

Thereby, a certain relative movability of the support plate in relation to the circuit board on the one hand and in relation to the housing part on the other hand can also be achieved. Because by the direct mechanical arrangement of the seal at the support plate and a certain elastic deformation possibility of this seal, the support plate can then also indirectly move in relation to the circuit board and/or to the housing part by the deformation of the seal.

Preferably the support plate is arranged spaced tot the circuit board but is arranged directly at the front housing part.

In an embodiment, the support plate comprises first electrical contact areas. They are provided as intended for connecting electrical lines of a heater of the camera. This heater is in particular formed for heating the lens module. Thus, these electrical lines can be connected to these first electrical contact areas outside of the lens module. In an embodiment, these lines are led from the lens module to the first contact areas. In an embodiment, the support plate comprises second electrical contact areas different from the first electrical contact areas. As intended, they are provided to the effect that electrical contact elements arranged on the circuit board can be connected. Thereby, an electrical coupling element is provided by the support plate in particularly advantageous manner, with which the electrical lines of the heater, which are led from the lens module, on the one hand, the electrical contact elements, which are arranged on the circuit board, on the other hand can be contacted. Thus, the support plate constitutes an objective component, which virtually allows an interposed contacting adapter. This is particularly advantageous to the effect that the electrical lines, which are led from the lens module, can thus be connected in improved manner. Undesired breaks or poor electrical contacts, which arise at these interfaces of the lines, which lead from the lens module, in the prior art, can then be avoided. Namely, it is thereby achieved that exactly these electrical lines of the heater, which lead from the lens module, do not have to be connected directly to the circuit board itself anymore. This results in poor electrical contacting conditions or else in detachment of the lines from the direct couplings on the circuit board in conventional configurations.

In an embodiment, the contact elements, which are arranged on the circuit board, are spring contacts. Thereby, a permanently stable electrical contacting can be achieved even if movement tolerances arise between the circuit board and the support plate. The spring contacts can for example be angled leaf springs or spring contact pins. These spring contact pins are also referred to as pogo pins.

Moreover, by this embodiment, it is possible to allow a simpler assembly of the lines of the heater, which lead from the lens module. The direct connection of such lines directly to the circuit board is very difficult and expensive. In terms of assembly, difficult requirements exist for this. In particular with respect to the automation, specific additional steps become required here. Especially if the lens module is screwed into the housing part, it is not or not exactly known, where the lines of the heater, which come from the lens module, are actually positioned. Therefore, especially in such configurations, it is difficult to solder these lines directly to the circuit board.

By this separate support plate, the assembly can be effected in particularly advantageous manner such that the lines from the lens module are soldered to the preset electrical contact areas on the support plate. In particular, it is then allowed that this pre-assembly module is provided and only afterwards a corresponding contacting with the circuit board is then effected. Therefore, it is simply possible to screw the lens module into the front housing part if a corresponding screw connection is provided here. Subsequently, soldering of the lines of the heater, which lead from the lens module, to a correspondingly provided contact area on the support plate can then be effected. Since the position of the lines after screwing the lens module into the front housing part is more subordinate with respect to the position in this respect, here too, a simple connection, in particular soldering, to these contact areas on the support plate can be simply effected. Due to the further contact areas on the support plate then additionally provided, which are then provided for electrically contacting the second electrical contact areas, a positional decoupling is virtually simply and reliably achieved in this respect. Nevertheless, a highly functional and secure path from an energy source, which is for example arranged on the circuit board, to the heater of the lens module is allowed. This contacting of the circuit board with the second electrical contact area on the support plate can then be simply and reliably achieved afterwards in the assembly method.

A further aspect of the invention relates to a motor vehicle with a camera according to the above mentioned aspect or an advantageous embodiment thereof. The camera can be installed at the motor vehicle for capturing an environment of the motor vehicle. However, it can also be a camera, which captures the interior space or the passenger compartment of the motor vehicle.

The camera can be a constituent of an electronic vehicle guidance system of the motor vehicle.

Embodiments of an aspect of the invention are embodiments of the other aspect of the invention, too.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not comprise all of the features of an originally formulated independent claim. Moreover, implementations and feature combinations are to be considered as disclosed, in particular by the implementations set out above, which extend beyond or deviate from the feature combinations set out in the relations of the claims.

Below, embodiments of the invention are explained in more detail based on schematic drawings.

Figure 2:
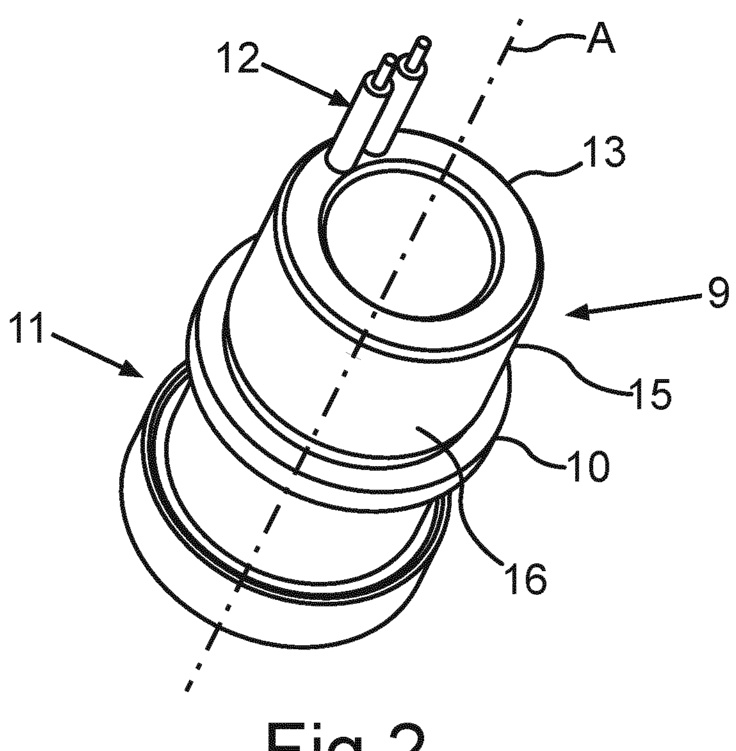
Figure 3:
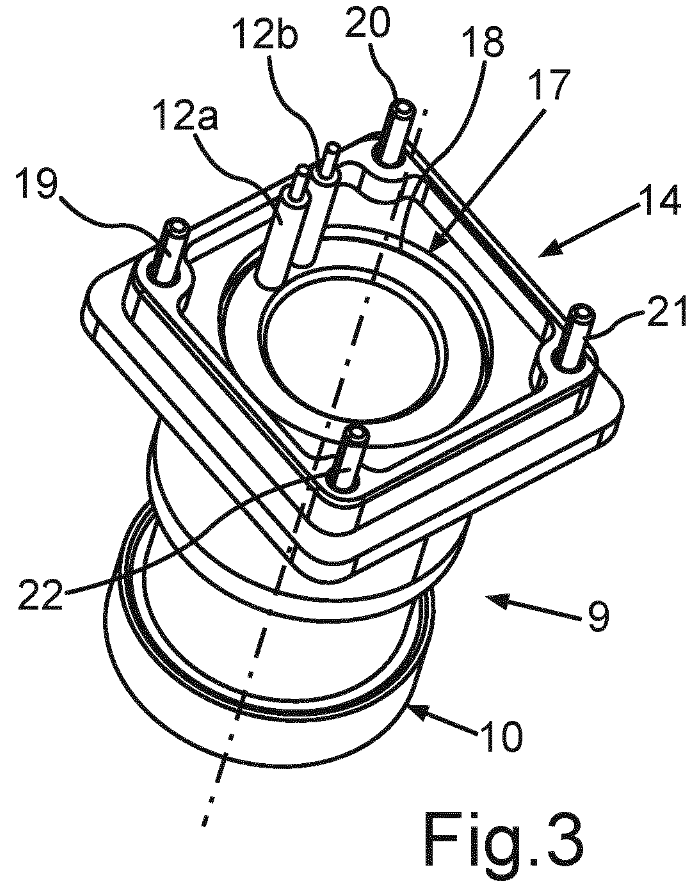
Figure 4:
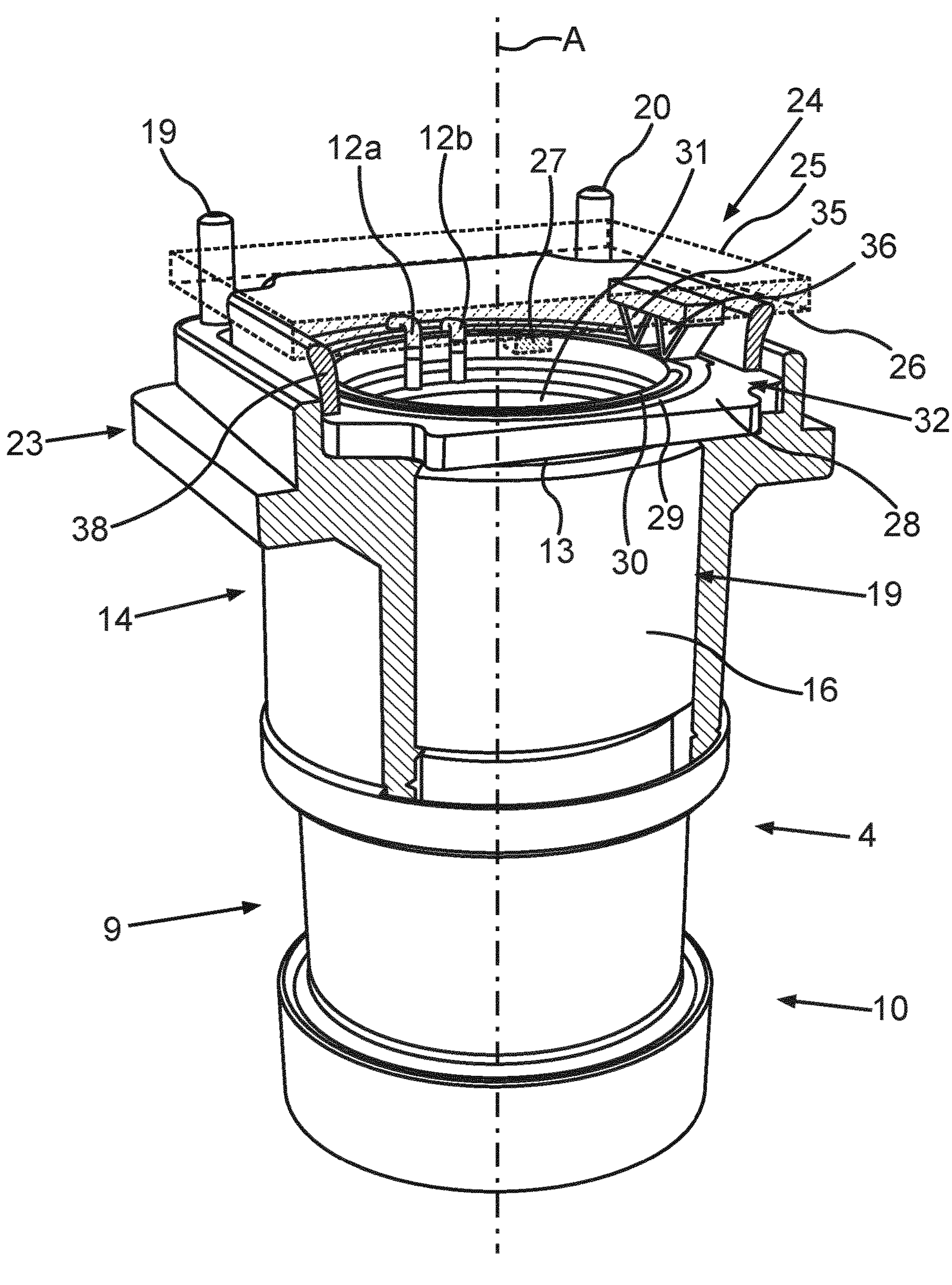
Figure 5:
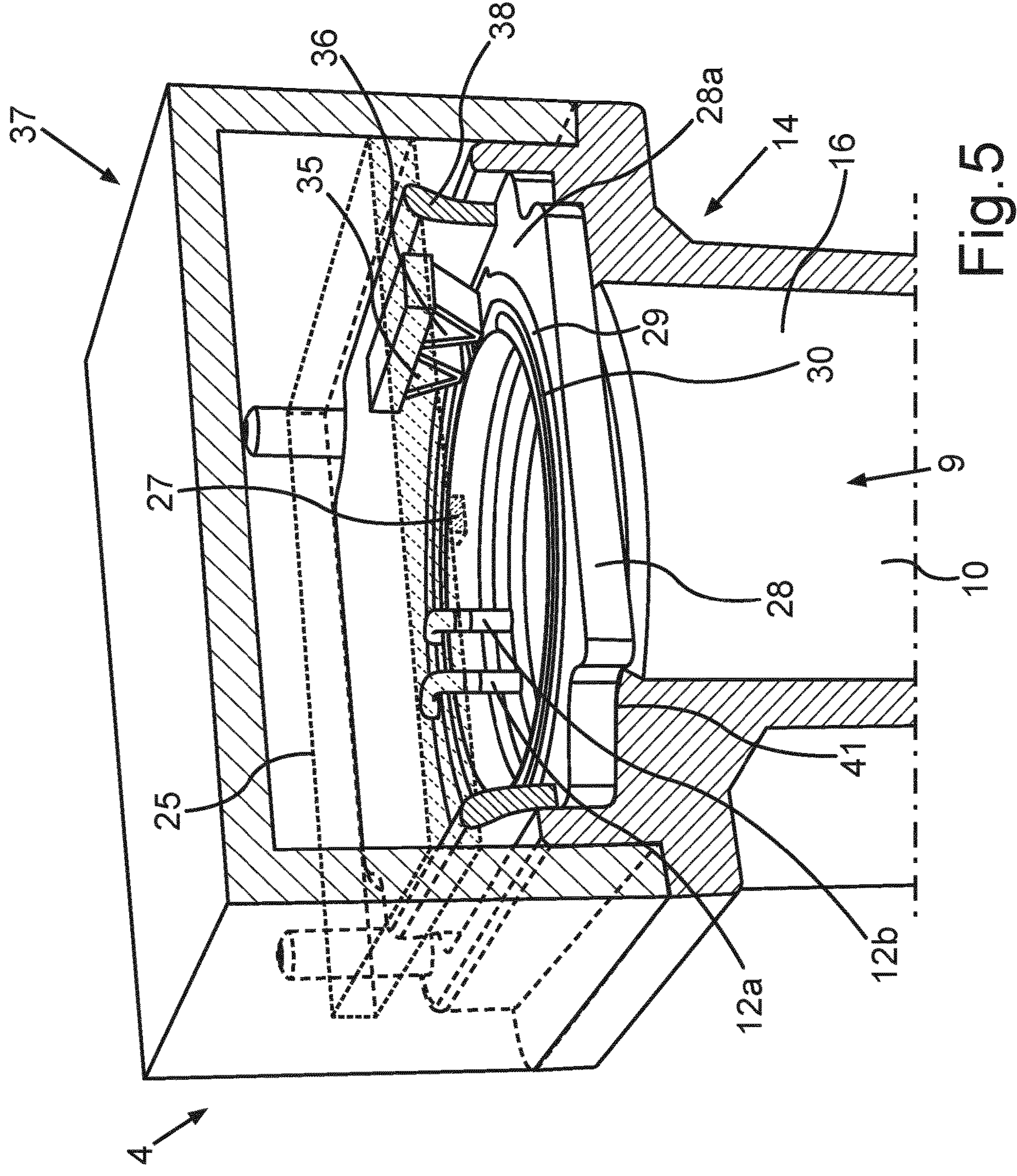
Figure 6:
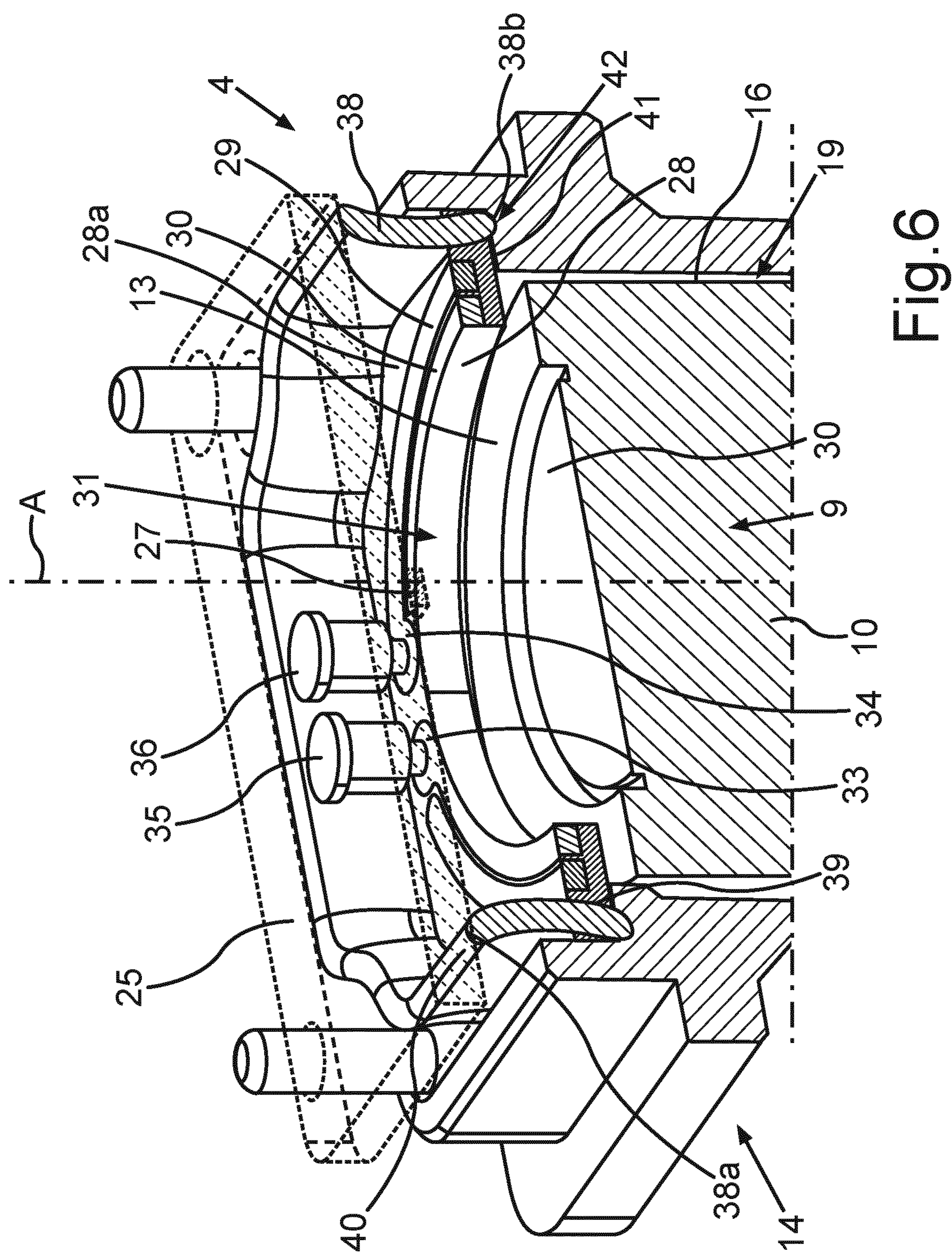
Figure 7:
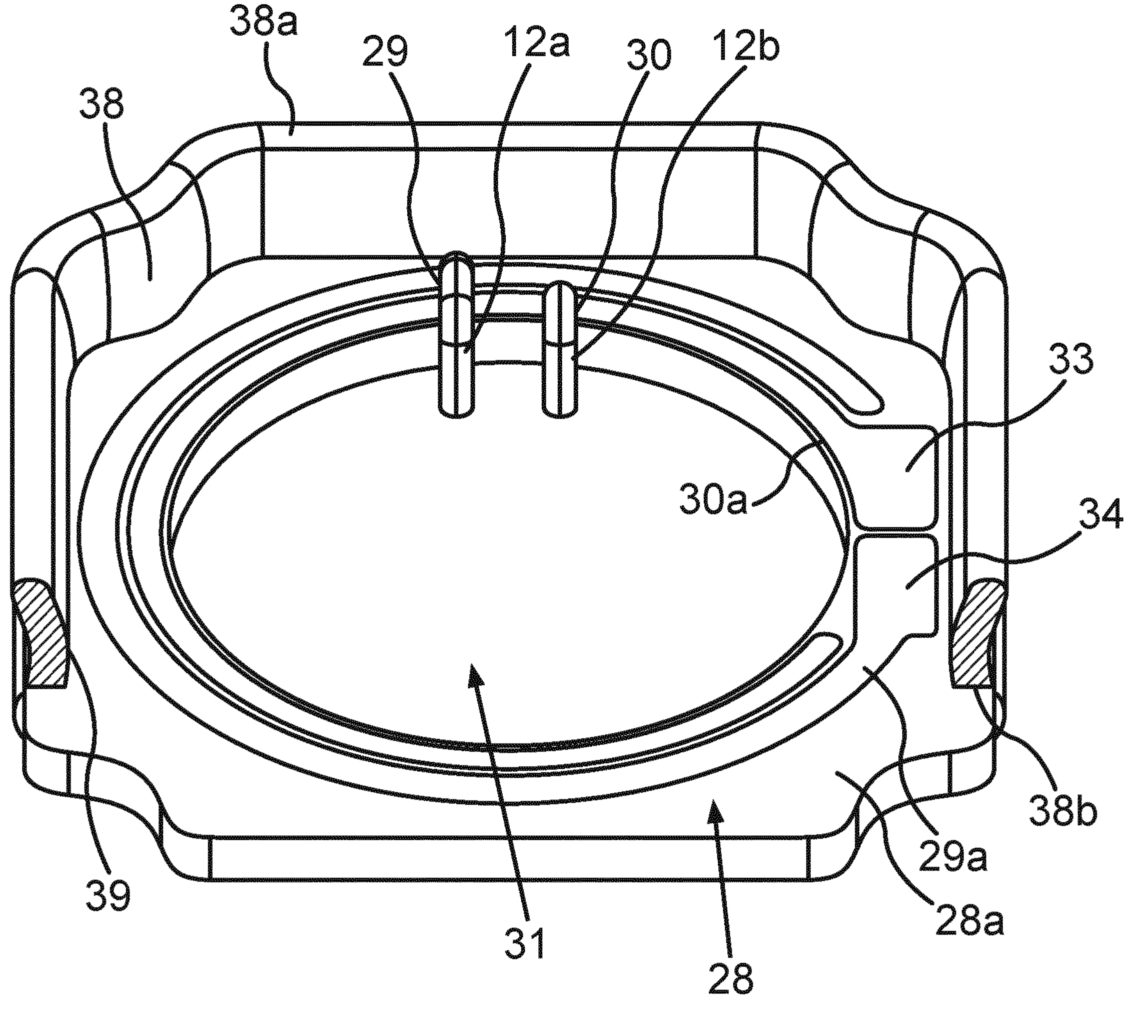

There show:

FIG. 1 a schematic top view to an embodiment of a motor vehicle according to the invention with an embodiment of a camera according to the invention;

FIG. 2 a perspective representation of partial components of an embodiment of a camera according to the invention;

FIG. 3 the representation of the components of the camera according to FIG. 2 in addition with a front housing part of a housing of the camera;

FIG. 4 a perspective representation of an embodiment of a camera according to the invention in partially sectioned view;

FIG. 5 a representation of the camera with an additional rear housing part;

FIG. 6 a perspective sectional representation of a partial area of the view in FIG. 4; and FIG. 7 a perspective representation of partial components of the camera according to FIG. 4 and FIG. 5.

In the figures, identical or functionally identical elements are provided with the same reference characters.

In FIG. 1, a motor vehicle 1 of the present invention is shown in a top view in an embodiment. Here, the motor vehicle 1 is formed as a passenger car. The motor vehicle 1 comprises an electronic vehicle guidance system or a driver assistance system 2. The driver assistance system 2 in turn comprises a control unit 3, which can for example be formed by an electronic controller of the motor vehicle 1. Moreover, the driver assistance system 2 comprises at least one camera 4. In the present embodiment, the driver assistance system 2 comprises four cameras 4, which are arranged distributed at the motor vehicle 1. Presently, one of the cameras 4 is arranged in a rear area 5, one of the cameras 4 is arranged in a front area 7 of the motor vehicle 1 and the remaining two cameras 4 are arranged in a respective lateral area 6, in particular in an area of the wing mirrors. Presently, the number and arrangement of the cameras 4 of the driver assistance system 2 are to be purely exemplarily understood.

Additionally or instead, at least one camera can also be provided, which is formed and arranged for capturing an interior space or a passenger compartment of the motor vehicle 1. The cameras are in particular installed such that they are assembled to an individual motor vehicle component. A motor vehicle component can for example be a bumper or an exterior mirror or a side trim. The motor vehicle component can for example also be a headliner or an interior trim or a cover of a steering wheel center or an interior mirror. The motor vehicle components are to be only exemplarily understood and alternative motor vehicle components can also be present. Thereby, it is only expressed that a motor vehicle component can be very diversely formed with respect to positional arrangement and material configuration.

In an embodiment, an environmental region 8 of the motor vehicle 1 can be captured by the cameras 4. Preferably, the four cameras 4 are formed identical in construction. In particular, an image sequence or video data can be provided by the cameras 4, which describe the environmental region 8. This video data can be transferred from the cameras 4 to the control unit 3. By means of the control unit 3, a display device of the motor vehicle 1 not illustrated here can be controlled such that the video data of the cameras 4 can be displayed to the driver. Thus, the driver assistance system 2 serves for assisting the driver of the motor vehicle 1 in driving the motor vehicle 1. The driver assistance system 2 can for example be a so-called electronic rearview mirror or a parking assistance system or another system. It can also be formed in the interior for capturing a person, in particular a vehicle driver.

In FIG. 2, a lens module 9 of a camera 4 is shown in a perspective representation. This lens module 9 comprises a module housing 10. At least one lens is arranged in it. Preferably, multiple lenses are arranged therein.

In the embodiment, a camera 4 also comprises a heater 11 for heating the lens module 9. Thereto, lines 12 of this heater 11 are provided. They are arranged in the lens module 9 to be able to heat the lenses located therein. The heating lines are led out of the lens module 9 on a rear side or a back side 13 of the lens module 9. The lens module 9 has a longitudinal axis A. In the embodiment, it is also a longitudinal axis of the camera 4 at the same time. This rear side or this back side 13 of the lens module 9 is arranged in a housing of the camera 4 in the installed state of the lens module 9 in the housing. Thus, the lines 12 are arranged in the housing of the camera 4.

In FIG. 3, the lens module 9 according to FIG. 2 is shown. Here, a front housing part 14 of the entire housing, which can also be referred to as exterior housing, of the camera 4 is additionally shown. In the shown embodiment, the lens module 9, in particular the module housing 10, comprises a thread 16 on an outer side 15 as it is indicated in FIG. 2. The lens module 9 is screwed in an opening 17 in the front housing part 14 by this thread 16. Thereto, a mating thread 19 (FIG. 4) not apparent in FIG. 3 is formed on an inner side 18 of this hole or the feed-through 17. In FIG. 3, the screwed-in final state of the lens module 9 in the front housing part 14 is illustrated. In this state, the lens module 9 partially extends into the housing and partially through the feed-through 17 out of the housing and thus also out of the front housing part 14 to the outside.

In FIG. 3, multiple connecting elements 19, 20, 21 and 22 are also shown. They are a constituent of the front housing part 14. In particular, they are provided for mechanically coupling to a rear housing part 37 (FIG. 5), not shown here, of this housing of the camera 4. The front housing part 14 and the rear housing part adjoining rearwards in axial direction are separate components in this respect.

In FIG. 4, a camera 4 with the components according to FIG. 3 is shown. Here too, a housing 23 of the camera 4 is only illustrated with the front housing part 14. Here too, the rear housing part 37 (FIG. 5) is not shown. The rear housing part axially adjoins to the front housing part 14. A receiving space 24 is formed between the front housing part 14 and this rear housing part. The circuit board 25 is arranged in this receiving space 24. As is apparent, the front housing part 14 is illustrated perspectively sectioned. An image sensor 27 only schematically illustrated in FIG. 4 is arranged on a top side 26 of the circuit board 25 facing the lens module 9. It faces the rear side or the back side 13 of the lens module 9. The lines 12*a* and 12*b* of the heater 11, which lead away from the lens module 9, are also apparent. Here, these lines 12*a* and 12*b* are attached to a support plate 28. In particular, they are welded to first electrical contact areas 29 and 30 (FIG. 7). Thus, these lines 12*a* and 12*b* terminate at this support plate 28. In FIGS. 4 and 5 the support plate 28 is shown in a non-sectioned illustration. Here, the support plate 28 is an integral separate component. It is a component separate both from the lens module 9 and from the circuit board 25 and from the housing parts 14, 37. In FIGS. 4 and 5 the lens module 9 is shown in a non-sectioned illustration.

Here, the support plate 28 is formed as a ring plate. In this context, it comprises a feed-through 31 or a corresponding hole. Thereby, the optical path between the image sensor 27 and the rear side 13 of the lens module 9 is not impaired.

In FIG. 5 an enlarged part of FIG. 4 is illustrated. Further a very schematically illustration of a rear housing part 37 is shown in FIG. 5.

As is apparent in FIG. 6 and FIG. 7, these electrical contact areas 29 and 30 are here formed as circumferential ring sections. Here, they are arranged concentrically to each other. They are virtually formed as conducting tracks. In this context, they are formed on a rear side 28*a* of this support plate 28 facing the circuit board 25. Consequently, the lines 12*a* and 12*b* are thus passed through the feed-through 31 coming from the lens module 9 and directly soldered to the first electrical contact areas 29 and 30 on this rear side 28*a*.

In that these first electrical contact areas 29 and 30 are formed as circumferential conducting tracks, the position in circumferential direction around the longitudinal axis A between the lens module 9 and the support plate 28 is subordinate. In screwing the lens module 9 into the first front housing part 14, therefore, this reached final position of the lens module 9 is subordinate compared to the support plate 28. Because a direct connection between the lines 12*a* and 12*b*, in particular the ends thereof, to these first electrical contact areas 29 and 30 can virtually be generated in each azimuthal position in circumferential direction around the longitudinal axis A. It is a further essential advantage since this relative rotational position between the lens module 9 and thus the lines 12*a* and 12*b* fixedly positioned thereon and the first electrical contact areas 29 and 30 in circumferential direction around this longitudinal axis A is thus subordinate. Virtually in each azimuthal position between the support plate 28 and the lens module 9, a corresponding direct contacting of these ends of the lines 12*a* and 12*b* with these ring sections can be generated corresponding to the first electrical contact areas 29 and 30.

As is moreover also apparent in FIG. 4, the support plate 28 is arranged spaced from the lens module 9 and/or spaced from the circuit board 25 viewed in axial direction in an embodiment. In this respect, thus, this support plate 28 is arranged in a clearance 32, which forms in axial direction between the circuit board 25 and the back side 13 of the lens module 9.

As is moreover also apparent in FIG. 4 as well as also in the perspective sectional representation in FIG. 6 and in the perspective representation of the support plate 28 in FIG. 7, this support plate 28 comprises, in particular on the rear side 28*a*, second electrical contract areas 33 and 34. Here, larger contact surfaces are only locally formed. They are each connected to ends 29*a* and 30*a* of the first electrical contact areas 29 and 30 line-shaped or ring section-shaped in this respect. In this respect, they directly transition into the corresponding first electrical contact areas 29 and 30. These second electrical contact areas 33 and 34 are provided as intended to allow an electrical direct connection to electrical contact elements, which are arranged on the circuit board 25. In this respect, such electrical contact elements 35 and 36 are exemplarily shown in FIG. 6. Here, they are formed as spring contact pins, in particular pogo pins. These contact elements 35, 36 are arranged directly on the top side 26 and directly abut on these second electrical contact areas 33 and 34 on the other hand, as it is apparent in FIG. 6.

In contrast, a further embodiment is shown in FIG. 4, in which spring contacts are also provided. Here, they are not formed as pogo pins, but as leaf spring elements. They are further examples for electrical contact elements 35, 36 and also abut on the second electrical contact areas 33 and 34. Thereby too, an axial resilience of the contact elements 35, 36 is allowed.

In an embodiment, it can be provided that an energy source is arranged on the circuit board 25. By it, energy can be transferred to the support plate 28 via these electrical contact elements 35, 36 and from there be transferred to the lines 12*a* and 12*b* via the second electrical contact areas 33, 34, the first electrical contact areas 29 and 30 such that heating energy can then be provided in the lens module 9 to heat the lens located therein.

In FIG. 5, the camera 4 is shown with an additional rear housing part 37 in a perspective representation.

In an embodiment, it is also apparent in FIG. 4, 5 and FIG. 6 that the camera 4 comprises an elastic seal 38. This elastic seal 38 is arranged between the circuit board 25 and the lens module 9 in axial direction. Thereby, the clearance 32 is separated from the remaining volume space in the receiving space 24 of the housing of the camera 4 at least in certain areas by this elastic seal 38. Thus, this clearance 32 is protected from entry of dust and dirt in improved manner.

Thereby, an optical path, which arises between the image sensor 27 and the rear side 13 of the lens module 9, can be kept more dust-free.

As is also apparent in FIG. 6, the opening 31 of the support plate 28 formed as a ring plate is positioned such that exactly this optical path is not impeded by the support plate 28.

In an embodiment, in which the support plate 28 is also present, the elastic seal 38 can be directly arranged on this support plate 28. In this context, it can for example be arranged at an outer rim edge 39 as it is shown in FIG. 6 and FIG. 7. Thus, this elastic seal 38 can be at least partially formed as a circumferential wall at this outer rim 39. In particular, it can for example be overmolded onto this outer rim 39. The elastic seal 38 has a greater elasticity than the support plate 28.

In the shown representations, this elastic seal 38 is formed especially completely circumferentially around the outer rim 39 of the support plate 28. Viewed in axial direction, the elastic seal 38 is arranged directly abutting on the top side 26 of the circuit board 25 with a first rim 38*a* as it is shown in FIG. 6 and FIG. 7.

In an embodiment, as it is shown in FIG. 6, a receptacle, in particular a groove-like recess 40, can be formed in this top side 26 of the circuit board 25 thereto. Then, the first rim 38*a* of this elastic seal 38 can engage with it.

In an embodiment, the elastic seal 38 can directly abut on an abutment surface 41 of the front housing part 14. This is shown in the perspective sectional representation in FIG. 6. Thereto, a second rim 38*b* of the seal 38, which opposes the first rim 38*a* in axial direction, in particular directly abuts on this abutment surface 41 in an embodiment. In an embodiment, it can be provided that a receptacle, in particular a groove-like recess 42, is formed on this abutment surface 41. The second rim 38*b* can extend into it.

In the embodiment shown in FIG. 6, the elastic seal 38 is directly connected to the support plate 28 such that the elastic seal 38 extends beyond the thickness of the support plate 28 on both sides in axial direction. Thereby, the seal 38 abuts directly on the circuit board 25 and directly on the front housing part 14 with its opposing rims 38*a* and 38*b* in the shown embodiment. In this respect, the support plate 28 is arranged spaced from and thus in contactless manner with the circuit board 25 and/or with the abutment surface 41. Thus, the support plate 28 can be arranged spaced from these mentioned components in axial direction. In this respect, a certain floating support is also possible.

In this embodiment, the seal 38 is fixedly connected to the support plate 28. In this respect, it cannot be detached from the support plate 28 without destruction.

Embodiments are also possible, in which the groove-like recesses 40 and/or 42 are not present.

In the embodiment in FIG. 5 the seal 38 is arranged only at the rear side 28*a*. The seal 38 extends only on one side of the support plate 28. The seal 38 extends from the rear side 28*a* in the direction to the circuit board 25. In FIG. 5 the seal 38 lays on the front side of the circuit board 25. The support plate 28 lays on the abutment surface 41.

The invention claimed is:

1. A camera for a motor vehicle, the camera comprising:

a housing, wherein a receiving space, which is bounded by the housing, contains a lens module of the camera and a circuit board of the camera, wherein the housing comprises a front housing part, in which the lens module is arranged, and wherein the front housing part comprises an abutment surface facing the circuit board; and a heater for heating the lens module, wherein the circuit board and the lens module are arranged axially spaced from each other in the direction of a longitudinal axis of the camera, so that a clearance is thus formed between the circuit board and the lens module, wherein a support plate of the camera is arranged between the circuit board and the lens module, wherein the support plate is a component separate from the circuit board, from the housing and from the lens module, and the support plate comprises first electrical contact areas, that are connected to electrical lines of the heater, wherein an elastic seal is arranged on the support plate such that the clearance is sealed from a remaining volume of the receiving space by the elastic seal, and wherein the elastic seal abuts the abutment surface with a second rim, wherein the electrical lines are led from the lens module to the first electrical contact areas, and wherein the support plate comprises second electrical contact areas, wherein electrical contact elements, which are arranged on the circuit board, are connected to the first or second electrical contact areas, so that energy is able to flow from the circuit board to the lens module to perform the heating of the lens module with the heater.

2. The camera according to claim 1, wherein the electrical contact elements, which are arranged on the circuit board, are spring contacts.

3. The camera according to claim 1, wherein the support plate is a ring plate, wherein the support plate is arranged in the clearance such that light in an optical path between the lens module and an image sensor of the camera goes through a hole in the ring plate, wherein the image sensor of the camera is arranged on the circuit board.

4. The camera according to claim 1, wherein the elastic seal is non-detachably arranged on the support plate and is overmolded to the support plate (28) by an overmolding process.

5. The camera according to claim 1, wherein the elastic seal is a ring.

6. The camera according to claim 1, wherein, the elastic seal directly abuts on a top side of the circuit board with a first rim.

7. The camera according to claim 6, wherein a groove-like recess is formed on the top side of the circuit board, wherein the elastic seal extends with the first rim into the groove-like recess.

8. The camera according to claim 1, wherein the abutment surface comprises a groove-shaped recess, wherein the elastic seal extends with the second rim into the groove-shaped recess.

9. The camera according to claim 8, wherein the elastic seal is arranged axially compressed between the circuit board and the abutment surface.

10. The camera according to claim 1, wherein an optical path extends in the clearance between an image sensor and a bottom side of the lens module, wherein the image sensor is arranged on a top side of the circuit board, wherein the optical path is separated from the remaining volume of the receiving space of the housing in dust-proof manner by the elastic seal.

11. The camera according to claim 1, wherein the elastic seal is arranged at an outer edge or a rear side of the support plate.

12. The camera according to claim 1, wherein the support plate is arranged in a contactless manner with the circuit board by the arrangement of the elastic seal and the support plate is arranged in direct contact with the front housing part.

13. A motor vehicle with a camera according to claim 1.

* * * * *